United States Patent
Yamanoi et al.

(10) Patent No.: US 10,147,938 B2
(45) Date of Patent: Dec. 4, 2018

(54) ELECTRODE MATERIAL FOR SECONDARY BATTERIES AND MANUFACTURING METHOD THEREOF, AND SECONDARY BATTERY

(71) Applicant: Sony Corporation, Tokyo (JP)

(72) Inventors: Shun Yamanoi, Kanagawa (JP); Seiichiro Tabata, Kanagawa (JP); Hironori Iida, Kanagawa (JP); Shinichiro Yamada, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 125 days.

(21) Appl. No.: 14/746,259

(22) PCT Filed: Oct. 17, 2013

(86) PCT No.: PCT/JP2013/078183
§ 371 (c)(1),
(2) Date: Jun. 22, 2015

(87) PCT Pub. No.: WO2014/103480
PCT Pub. Date: Jul. 3, 2014

(65) Prior Publication Data
US 2015/0349331 A1 Dec. 3, 2015

(30) Foreign Application Priority Data
Dec. 27, 2012 (JP) ................. 2012-284755

(51) Int. Cl.
*H01M 4/36* (2006.01)
*H01M 4/133* (2010.01)
(Continued)

(52) U.S. Cl.
CPC ........... *H01M 4/364* (2013.01); *C01B 32/342* (2017.08); *H01M 4/133* (2013.01);
(Continued)

(58) Field of Classification Search
CPC .... H01M 4/133; H01M 4/1393; H01M 4/625; H01M 4/583; H01M 2004/021; C01B 31/081
See application file for complete search history.

(56) References Cited

U.S. PATENT DOCUMENTS 5,616,436 A  4/1997  Sonobe et al.
6,303,249 B1  10/2001  Sonobe et al.
(Continued)

FOREIGN PATENT DOCUMENTS

JP  04-359861  12/1992
JP  H04-359861 A  12/1992
(Continued)

OTHER PUBLICATIONS

Machine translation of JP3239374B2.*
(Continued)

*Primary Examiner* — Eric R Smith
(74) *Attorney, Agent, or Firm* — K&L Gates LLP

(57) ABSTRACT

Provided is an electrode material for secondary batteries, including a porous carbon material being derived from a plant and having an average particle size of less than 4 μm.

13 Claims, 5 Drawing Sheets

(51) Int. Cl.
  *H01M 4/1393* (2010.01)
  *H01M 4/58* (2010.01)
  *H01M 4/62* (2006.01)
  *H01M 4/04* (2006.01)
  *H01M 10/052* (2010.01)
  *C01B 32/342* (2017.01)
  *H01M 10/0525* (2010.01)
  *H01M 4/02* (2006.01)

(52) U.S. Cl.
  CPC ......... *H01M 4/1393* (2013.01); *H01M 4/581* (2013.01); *H01M 4/625* (2013.01); *H01M 4/0471* (2013.01); *H01M 4/0492* (2013.01); *H01M 10/0525* (2013.01); *H01M 2004/021* (2013.01)

(56) References Cited

U.S. PATENT DOCUMENTS

| | | | |
|---|---|---|---|
| 2003/0113624 | A1 | 6/2003 | Kim et al. |
| 2010/0069507 | A1 | 3/2010 | Tabata et al. |
| 2010/0291167 | A1* | 11/2010 | Iida .......... A61K 8/19 424/401 |
| 2011/0082024 | A1* | 4/2011 | Liu .......... A61K 9/51 502/5 |

FOREIGN PATENT DOCUMENTS

| | | |
|---|---|---|
| JP | 08-064207 | 3/1996 |
| JP | H08-064207 A | 3/1996 |
| JP | 3239374 B2 * | 12/2001 |
| JP | 2003-197196 | 7/2003 |
| JP | 3565994 | 9/2004 |
| JP | 2006-092881 A | 4/2006 |
| JP | 2008-273816 | 11/2008 |
| JP | 2008-273816 A | 11/2008 |
| JP | 2010-095390 | 4/2010 |
| JP | 2010-146908 | 7/2010 |
| JP | 2010-257689 | 11/2010 |
| JP | 2011-518743 | 6/2011 |
| JP | 2012-041220 | 3/2012 |

OTHER PUBLICATIONS

N. Tancredi et al., "Activated carbons from Uruguayan eucalyptus wood", Fuel 75(15), p. 1701-1706 (Year: 1996).*

C. Zou et al., "Template-free fabrication of hierarchical porous carbon by constructing carbonyl crosslinking bridges between polystyrene chains", Journal of Materials Chemistry 20, p. 731-735 (Year: 2010).*

X. Zeng, et al., "Preparation and electrochemical properties of pitch-based activated carbon aerogels", Electrochimica Acta 53, p. 5711-5715 (Year: 2008).*

Naoki Tachikawa et al., "Reversibility of electrochemical reactions of sulfur supported on inverse opal carbon in glyme-Li salt molten complex electrolytes," Chem. Commun., 2011, 47, 8157-8159. (3 pages).

Xiulei Ji et al., "A highly ordered nanostructured carbon-sulphur cathode for lithium-sulphur batteries," Nature Materials, vol. 8, Jun. 2009, 500-506, Published online May 17, 2009. (7 pages).

Office Action in counterpart Japanese Patent Application No. 2014-554200 dated Mar. 6, 2018. (4 pages).

P.M. Yeletsky, et al., Synthesis of mesoporous carbons by leaching out natural silica templates of rice husk, Microporous and Mesoporous Materials 121 (2009) pp. 34-40. (8 pages).

* cited by examiner

A

B

A

B

ELECTRODE MATERIAL FOR SECONDARY BATTERIES AND MANUFACTURING METHOD THEREOF, AND SECONDARY BATTERY

CROSS REFERENCES TO RELATED APPLICATIONS

The present application is a national stage of International Application No. PCT/JP2013/078183 filed on Oct. 17, 2013 and claims priority to Japanese Patent Application No. 2012-284755 filed on Dec. 27, 2012, the disclosure of which is incorporated herein by reference.

BACKGROUND

The present disclosure relates to an electrode material for secondary batteries and a manufacturing method thereof, and a secondary battery.

A lithium-sulfur secondary battery in which sulfur as a simple substance is used as a positive electrode active substance and lithium (Li) is used as a negative electrode active substance is under development. Lithium and sulfur have theoretical volume densities of approximately 3862 mAh/g and approximately 1672 mAh/g respectively, and are considered to enable a secondary battery having an extraordinarily higher energy density to be obtained. However, the lithium-sulfur secondary battery has not been practically realized, because
(1) the utilization ratio of sulfur as a positive electrode active substance is low, and
(2) charge-discharge cycle properties are poor.
Thus, the extraordinarily high theoretical volume density, which is characteristics of the lithium-sulfur secondary battery, has not been sufficiently exploited.

CITATION LIST

Patent Literature

Patent Literature 1: JP 2010-257689A

Non-Patent Literature

Non-Patent Literature 1: L. Nazar et. al., Nature Materials, 8, 500, 2009
Non-Patent Literature 2: M. Watanabe et. al., Chem. Commun, 47, 8157-8159 (2011)

SUMMARY

Technical Problem

A method for solving such a problem may include a method of inserting sulfur into a porous material containing carbon. This allows conductive substances to exist in the vicinity of sulfur components, thereby facilitating electron transfer. Also, sulfur can be retained in voids of the porous material containing carbon, and furthermore, sulfur and lithium ions react with each other within the voids. Therefore, the generated sulfide is inhibited from being discharged from the voids to the outside. Here, as the porous material containing carbon, Ketjen black, carbon black, acetylene black and activated carbon, each being a hollow nano-carbon material having a graphene layer, are generally used (for example, see JP 2010-257689A). Also, as other porous materials, there are known a system in which sulfur is retained in voids of rod-like nano-carbon (see L. Nazar et. al., Nature Materials, 8, 500, 2009), and a system in which sulfur is retained in inverse-opal carbon (see M. Watanabe et. al., Chem. Commun., 47, 8157-8159 (2011)). However, there are actually few proposals on the carbon-containing porous material having both conductivity and optimum voids (size and volume). Also, there are few discussions on optimum voids.

Therefore, an object of the present disclosure is to provide an electrode material for obtaining a secondary battery that can improve the utilization ratio of an active substance and that is excellent in charge-discharge cycle properties, and a manufacturing method thereof, as well as a secondary battery including such an electrode material.

Solution to Problem

In order to solve the above problems, an electrode material for secondary batteries according to the present disclosure includes a porous carbon material being derived from a plant and having an average particle size of less than 4 µm, preferably 0.5 µm or less.

In order to solve the above problems, a secondary battery according to the present disclosure includes an electrode including a porous carbon material being derived from a plant and having an average particle size of less than 4 µm, preferably 0.5 µm or less.

In order to solve the above problems, a manufacturing method of an electrode material for secondary batteries according to the present disclosure includes, after carbonizing a plant-derived material at 400° C. to 1400° C., performing treatment with acid or alkali on the carbonized material, and then pulverizing the treated material, to obtain the electrode material for secondary batteries including a porous carbon material having an average particle size of less than 4 µm, preferably 0.5 µm or less.

Advantageous Effects of Invention

In the present disclosure, the electrode material for secondary batteries includes a porous carbon material that is derived from a plant and that has an average particle size of less than 4 µm. That is, the plant-derived porous carbon material allows a pore distribution to be unique, and furthermore, the micro average particle size being less than 4 µm causes many voids to exist among fine particles of the porous carbon material. Therefore, sulfur or a sulfur compound is unlikely to be detached from a mixture system of the porous carbon material and sulfur or a sulfur compound. That is, the porous carbon material can surely retain an active substance within its pores, and can inhibit a reaction product of the active substance, generated in voids, from being discharged from the pores to the outside. On the other hand, an electrolytic solution contained in a secondary battery, constituting the secondary battery, is likely to pass through the electrode. Therefore, as a result of the above, there can be provided an electrode material for obtaining a secondary battery that can improve the utilization ratio of an active substance and that is excellent in charge-discharge cycle properties.

Additional features and advantages are described herein, and will be apparent from the following Detailed Description and the figures.

DETAILED DESCRIPTION

Figure 1:
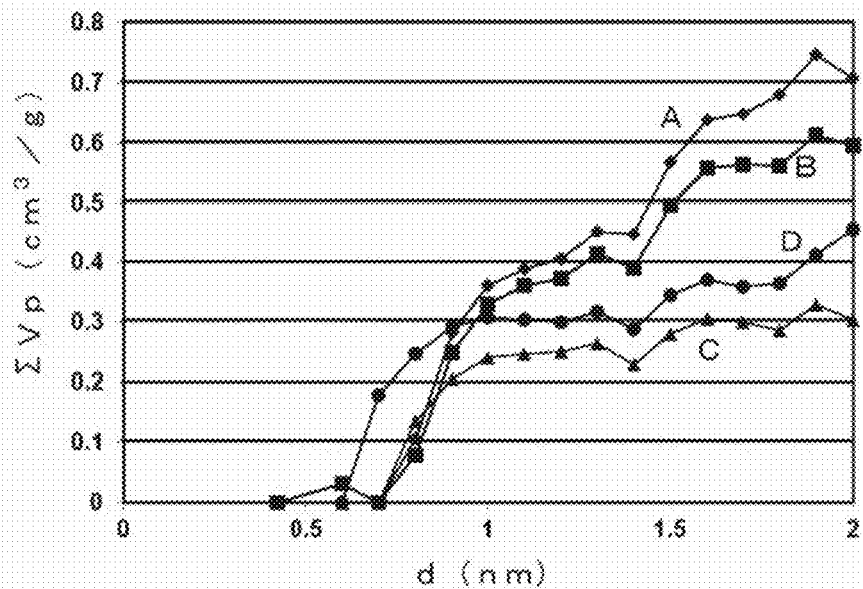
FIG. 1 is a graph illustrating cumulative volumes of micropores in electrode materials (porous carbon materials) according to Example 1A, Example 1B, Example 1C and Comparative Example 1.

Although the present disclosure will be described below based on examples with reference to drawings, the present disclosure is not restricted to the examples, and various numerical values and materials in the examples are exemplary. It is noted that description will be provided in the following order.
1. Description on electrode material for secondary batteries and manufacturing method thereof, secondary battery, and general subject according to the present disclosure
2. Example 1 (electrode material for secondary batteries and manufacturing method thereof, and secondary battery according to the present disclosure), and others
[Description on Electrode Material for Secondary Batteries and Manufacturing Method Thereof, Secondary Battery, and General Subject According to the Present Disclosure]

The secondary battery according to the present disclosure may have a form in which a positive electrode is constituted by an electrode. Furthermore, the secondary battery according to the present disclosure including the above-described form may be configured to be constituted by a lithium-sulfur secondary battery and include an electrode that carries sulfur or a sulfur compound. The configuration and structure in themselves of the secondary battery may be a known construction and structure. As sulfur, $S_8$ sulfur may be included, and as a sulfur compound, insoluble sulfur, colloidal sulfur, and organic sulfur compounds (such as disulfide compounds and trisulfide compounds) may be included. Also, a preparation method of a positive electrode may include a method of slurrying sulfur or a sulfur compound, a porous carbon material and other materials, and applying the slurry on a substrate constituting a positive electrode. Other examples of the preparation method may include a liquid penetration method, a solution penetration method, a PVD method, and a CVD method.

A manufacturing method of the electrode material for secondary batteries according to the present disclosure may have a form in which after pulverization, heat treatment is performed at a temperature exceeding the temperature during carbonization. When heat treatment is performed at a temperature exceeding the temperature during carbonization in this manner, a kind of densification occurs in the porous carbon material. As a result, there can be provided a porous carbon material having voids (size and volume) that is further suitable as an electrode material. Furthermore, in the manufacturing method of the electrode material for secondary batteries according to the present disclosure including such a form, treatment with acid or alkali is preferably performed to remove silicon components contained in the carbonized plant-derived material. Also, activation treatment may be performed after the treatment with acid or alkali, or activation treatment may be performed before the treatment with acid or alkali.

In the electrode material for secondary batteries according to the present disclosure including the above-described preferred configuration and the like, or the manufacturing method of the electrode material for secondary batteries including the above-described preferred configuration, it is desired that the value of the specific surface area using the nitrogen BET method for the porous carbon material is 500 $m^2/g$ or more, preferably 1000 $m^2/g$ or more, and more preferably 1200 $m^2/g$ or more. Also, it is desired that the volume of pores using the BJH method is 0.7 $cm^3/g$ or more, and preferably 1.0 $cm^3/g$ or more. It is noted that the volume of pores having a pore size of 50 nm or less using the BJH method is 0.7 $cm^3/g$ or more, and the volume of pores having a pore size of more than 50 nm and not more than 200 nm using the BJH method is 0.1 $cm^3/g$ or more (preferably 0.3 $cm^3/g$ or more). Furthermore, in the electrode material for secondary batteries and the like or the manufacturing method of the electrode material for secondary batteries according to the present disclosure including these preferred configurations, the raw material of the porous carbon material is, but not restricted to, preferably a plant-derived material having a content ratio of silicon (Si) of 5% by mass or more. Also, it is desired that the porous carbon material has a content ratio of silicon (Si) of less than 5% by mass, preferably not more than 3% by mass, and more preferably not more than 1% by mass.

Analysis of various elements can be performed by, for example, the energy dispersive spectroscopy (EDS) using an energy dispersive X-ray analyzer (for example, JED-2200F available from JEOL Ltd.). Here, the measurement condition may be defined to be, for example, a scanning voltage of 15 kV and an irradiation current of 10 μA.

In the present disclosure, a material (a porous carbon material before pulverization) obtained by, as described above, carbonizing a plant-derived material at 400° C. to 1400° C., and then treating the carbonized material with acid or alkali, is referred to as a "porous carbon material intermediate" for convenience. Also, a manufacturing method of such a porous carbon material intermediate is hereinafter sometimes referred to as a "manufacturing method of a porous carbon material intermediate". A material that is obtained by carbonizing a plant-derived material at 400° C. to 1400° C. and that is before the treatment with acid or alkali is referred to as a "porous carbon material precursor" or a "carbonaceous substance".

In the manufacturing method of the electrode material for secondary batteries according to the present disclosure (hereinafter, sometimes merely referred to as the "manufacturing method of the electrode material according to the present disclosure"), as previously described, a process of performing activation treatment may be included after the treatment with acid or alkali, or activation treatment may be performed before the treatment with acid or alkali. Also, in the manufacturing method of the electrode material according to the present disclosure including such a preferred embodiment, some type of plant-derived material used may be subjected to heat treatment in a state where oxygen is blocked, at a temperature (for example, 400° C. to 700° C.) lower than the temperature for carbonization, before carbonizing the plant-derived material. It is noted that such heat treatment is referred to as "preliminary carbonization treatment". Accordingly, tar components to be generated during a carbonization process can be extracted. As a result, tar components to be generated during a carbonization process can be reduced or eliminated. It is noted that the state where oxygen is blocked can be achieved by setting, for example, an inert gas atmosphere such as nitrogen gas and argon gas, a vacuum atmosphere, or a kind of state where a plant-derived material is steamed and roasted. Also, in the manufacturing method of the electrode material according to the present disclosure, some type of plant-derived material used may be immersed in alcohol (for example, methyl alcohol, ethyl alcohol and isopropyl alcohol), in order to reduce mineral components and moisture contained in a plant-derived material, or in order to inhibit off-flavor from occurring during a carbonization process. It is noted that in the manufacturing method of the electrode material according to the present disclosure, preliminary carbonization treatment may be performed afterwards. An example of a material that is preferably subjected to preliminary carbonization treatment in inert gas may include a plant that generates a large amount of wood vinegar (tar or light oil content). Also, an example of a material that is preferably subjected to pre-treatment with alcohol may include marine algae that contain a large amount of iodine and various minerals.

In the manufacturing method of the porous carbon material intermediate, a plant-derived material is carbonized at 400° C. to 1400° C. Here, carbonization generally means heat-treating an organic substance (in the present disclosure, a plant-derived material) to convert the organic substance into a carbonaceous substance (for example, see JIS M0104-1984). It is noted that the atmosphere for carbonization may include an atmosphere in which oxygen is blocked, and may specifically include a vacuum atmosphere, an inert gas atmosphere such as nitrogen gas and argon gas, and an atmosphere in which a plant-derived material is in a kind of state of being steamed and roasted. The temperature increasing rate to the carbonization temperature may be, but not restricted to, 1° C./min or more, preferably 3° C./min or more, and more preferably 5° C./min or more, under such an atmosphere. Also, the upper limit of the carbonization time may be, but not restricted to, 10 hours, preferably 7 hours, and more preferably 5 hours. The lower limit of the carbonization time may be a time necessary for surely carbonizing a plant-derived material. Also, a plant-derived material may be pulverized to have desired granularity, or may be classified, as desired. A plant-derived material may be previously washed. The form, configuration and structure of a furnace used for carbonization are not restricted, and a continuous furnace or a batch furnace may be used as the furnace for carbonization.

The atmosphere for heat treatment may include an atmosphere in which oxygen is blocked, and may specifically include a vacuum atmosphere, an inert gas atmosphere such as nitrogen gas and argon gas, and an atmosphere in which the porous carbon material intermediate is in a kind of state of being steamed and roasted. The temperature increasing rate to the heat treatment temperature may be, but not restricted to, 1° C./min or more, preferably 3° C./min or more, and more preferably 5° C./min or more, under such an atmosphere. The difference between the carbonization temperature and the heat treatment temperature may be appropriately determined based on various tests performed. Also, the upper limit of the heat treatment time may be, but not restricted to, 10 hours, preferably 7 hours, and more preferably 5 hours. The lower limit of the heat treatment time may be determined to be a time allowing desired properties to be imparted to the porous carbon material. The form, configuration and structure of a furnace used for heat treatment are not restricted, and a continuous furnace or a batch furnace may be used as the furnace for heat treatment.

In the manufacturing method of the electrode material according to the present disclosure, as described above, when activation treatment is performed, micropores (described later) having a pore size of less than 2 nm can be increased. Examples of an activation treatment method may include a gas activation method and a chemical activation method. Here, the gas activation method is a method of using, as an activation agent, oxygen, water vapor, carbonic acid gas, air and the like to heat the porous carbon material intermediate under such a gas atmosphere at 700° C. to 1400° C., preferably 700° C. to 1000° C., and more preferably 800° C. to 1000° C., for dozens of minutes to several hours, so that volatile matter and carbon molecules contained in the porous carbon material intermediate causes development of microstructure. It is noted that the heating temperature during the activation treatment may be appropriately selected based on the type of plant-derived material, the type and concentration of gas, and the like. The chemical activation method is a method of performing activation using zinc chloride, iron chloride, calcium phosphate, calcium hydroxide, magnesium carbonate, potassium carbonate, sulfuric acid or the like, instead of oxygen and water vapor used in the gas activation method, washing the activated product, adjusting pH with an alkaline aqueous solution, and drying the resultant product.

In the manufacturing method of the electrode material for secondary batteries according to the present disclosure, the treatment with acid or alkali allows silicon components contained in the carbonized plant-derived material to be removed. Here, examples of silicon components may include silicon oxides such as silicon dioxide, silicon oxide, and salts of silicon oxide. This removal of silicon components in the carbonized plant-derived material enables the porous carbon material having a high specific surface area to be obtained. In some instances, silicon components in the carbonized plant-derived material may be removed based on the dry etching process. That is, in a preferred embodiment of the porous carbon material, when a plant-derived material containing silicon (Si) used as a raw material is converted into the porous carbon material precursor or the carbonaceous substance, the plant-derived material is carbonized at high temperature (for example, 400° C. to 1400° C.), such that silicon contained in the plant-derived material becomes silicon components (silicon oxides) such as silicon dioxide ($SiO_x$), silicon oxide, and salts of silicon oxide, instead of becoming silicon carbide (SiC). It is noted that the silicon components (silicon oxides) contained in the plant-derived material before carbonization do not substantially change even when carbonized at high temperature (for example, 400° C. to 1400° C.). Therefore, when treatment with acid or alkali (a base) is performed in the subsequent process, the silicon components (silicon oxides) such as silicon dioxide, silicon oxide, and salts of silicon oxide are removed, thereby enabling the value of the specific surface area using the nitrogen BET method to become large. In addition, the porous carbon material is a naturally occurring substance-derived environmentally compatible material, and the microstructure thereof can be obtained by treating the silicon components (silicon oxides) previously contained in a raw material, which is a plant-derived material, with acid or alkali for removal. Accordingly, the array of pores maintains biological regularity peculiar to a plant.

As described above, the porous carbon material includes a plant-derived material as a raw material. Specifically, as the plant-derived material, chaff of rice (rice plant), barley, wheat, rye, Japanese millet and foxtail millet, straw, coffee beans, tea leaves (for example, leaves of green tea and red tea), sugar canes (for example, bagasse), corns (for example, cores of corns), fruit peels (for example, citrus peels such as orange peels, grapefruit peels and mandarin orange peels, and banana peels), or reed and "kuki wakame" (sliced seaweed stem) are exemplified and are not restricted, and further, a vascular bundle plant which is vegetative on land, a pteridophyte, a bryophyte, algae and seagrass are exemplified. These materials may be used singly as the raw material, or a plurality of species can be mixed and used. The shape and the form of the plant-derived material are not especially restricted and, for example, the chaff and the straw can be used without modification, or those dry-treated may be used. Further, those subjected to various treatments such as a fermentation treatment, a roasting treatment and an extraction treatment during the processing of food and drink such as beer and liquor can be used. In view of recycling industrial wastes, the straw and the chaff after the processing such as thrashing can be preferably used. The straw and the chaff after the processing can be easily obtained in large quantities, for example, at a farmer's cooperative, a distillery, a food company and a food processing company.

A porous carbon material has many pores. The pores include "mesopores" having a pore size of 2 nm to 50 nm, "micropores" having a pore size of less than 2 nm, and "macropores" having a pore size of more than 50 nm. Specifically, for example, it is desired that the volume of mesopores having a pore size of 50 nm or less is 0.7 cm$^3$/g or more, and the volume of macropores having a pore size of more than 50 nm and not more than 200 nm is 0.1 cm$^3$/g or more (preferably 0.3 cm$^3$/g or more). Also, as micropores, for example, pores having a pore size of approximately 1.9 nm, pores of approximately 1.5 nm, and pores of approximately 0.8 nm to 1 nm are contained in a large amount.

It is desired that the value of the specific surface area using the nitrogen BET method (hereinafter, sometimes merely referred to as the "value of the specific surface area") of a porous carbon material is preferably 50 m$^2$/g or more, more preferably 100 m$^2$/g or more, and further preferably 400 m$^2$/g or more, in order to obtain further excellent functionality.

The nitrogen BET method refers to a method in which an adsorption isotherm is measured by adsorbing and desorbing nitrogen as an adsorption molecule to and from an adsorbent (herein, a porous carbon material) and analyzing the measured data in accordance with a BET equation represented by Equation (1), and a specific surface area and a pore volume can be calculated based on the above method. Specifically, in case of calculating the value of the specific surface area in accordance with the nitrogen BET method, the adsorption isotherm is obtained at first by adsorbing and desorbing the nitrogen as the adsorption molecule to and from the porous carbon material. Then, $[p/\{Va(p_0-p)\}]$ is calculated based on Equation (1) or Equation (1') obtained by transforming Equation (1) from the adsorption isotherm obtained, and is plotted with regard to an equilibrium relative pressure ($p/p_0$). Then, the plot is regarded as a straight line, and a slant 's' ($=[(C-1)/(C \cdot V_m)]$) and an intercept 'i' ($=[1/(C \cdot V_m)]1$ are calculated based on a least-square approach. Then, $V_m$ and 'C' are calculated from the slant 's' and the intercept T based on Equation (2-1) and Equation (2-2). Further, the specific surface area $a_{sBET}$ is calculated from $V_m$ based on Equation (3) (refer to page 62 to page 66, a manual of analysis software of BELSORP-mini and BELSORP available from Bell Japan Inc.). This nitrogen BET method is a measurement method which is compliant with JIS R 1626-1996 "Measuring methods for the specific surface area of fine ceramic powders by gas adsorption using the BET method".

$$V_a = (V_m \cdot C \cdot p)/[(p_0 - p)\{1 + (C-1)(p/p_0)\}] \quad (1)$$

$$[p/\{V_a(p_0 - p)\}] = (C-1)/(C \cdot V_m)](p/p_0) + [^1/(C \cdot V_m)] \quad (1')$$

$$V_m = 1/(s + i) \quad (2\text{-}1)$$

$$C = (s/i) + 1 \quad (2\text{-}2)$$

$$a_{sBET} = (V_m \cdot L \cdot \sigma)/22414 \quad (3)$$

Symbols are as stated below.
$V_a$: amount of adsorption
$V_m$: amount of adsorption of single molecular layer
p: pressure of nitrogen at equilibrium
$p_0$: pressure of nitrogen at saturation
L: Avogadro number
σ: adsorption sectional area of nitrogen In case of calculating the pore volume $V_p$ in accordance with the nitrogen BET method, for example, the adsorption data of the adsorption isotherm obtained is linear-interpolated, and an amount of adsorption 'V' is obtained at the relative pressure established as the relative pressure for calculating the pore volume. The pore volume $V_p$ can be calculated from the amount of adsorption 'V' based on Equation (4) (refer to page 62 to page 65 of the manual of analysis software of BELSORP-mini and BELSORP available from Bell Japan Inc.). Hereinafter, the pore volume in accordance with the nitrogen BET method will be sometimes referred to as simply "pore volume".

$$V_p = (V/2241) \times (M_g/\sigma_g) \quad (4)$$

Symbols are as stated below.
V: amount of adsorption at relative pressure
$M_g$: molecular weight of nitrogen
$\sigma_g$: density of nitrogen The pore size of the mesopore can be, for example, calculated as pore distribution from a pore volume change rate based on the BJH method. The BJH method is a method widely used as a method for pore distribution analysis. In case of pore distribution analysis n accordance with the BJH method, a desorption isotherm is at first measured by adsorbing and desorbing nitrogen as an adsorption molecule to and from a porous carbon material. Then, based on the obtained desorption isotherm, a thickness of an adsorption layer between a state in which the pore is filled with an adsorption molecules (for example, nitrogen) and a state in which the adsorption molecules desorb stepwise, and an inner diameter of the pores (twice core radius) generated on this occasion are measured, a pore radius rp is calculated based on Equation (5), and the pore volume is calculated based on Equation (6). Then, a curve of a pore distribution can be obtained by plotting the pore volume change rate ($dV_p/dr_p$) with respect to a pore diameter ($2r_p$) from the pore radius and the pore volume (refer to page 85 to page 88 of the manual of analysis software of BELSORP-mini and BELSORP available from Bell Japan Inc.).

$$r_p = t + r_k \quad (5)$$

$$V_{pn} = R_n \cdot dV_n - R_n \cdot dt_n \cdot c \cdot \Sigma A_{pj} \quad (6)$$

Note that:

$$Rn = r_{pn}^2 / (r_{kn} - 1 + dt_n)^2 \quad (7)$$

Symbols are as stated below.

$r_p$: pore radius $r_k$: core radius (inner diameter/2) when absorption layer having thickness 't' is adsorbed on inner wall of pore having pore radius $r_p$ at its pressure $V_{pn}$: pore volume when 'n'th desorption of nitrogen takes place $dV_n$: amount of change on this occasion $dt_n$: amount of change of thickness $t_n$ of adsorption layer when 'n'th desorption of nitrogen takes place $r_{kn}$: core radius on this occasion c: fixed value $r_{pn}$: pore radius when 'n'th desorption of nitrogen takes place $\Sigma A_{pj}$ represents an integration value of a pore wall surface area from j=1 to j=n−1.

The pore size of the micropore can be calculated as the pore distribution from the pore volume change rate with respect to its pore size, for example, in accordance with the MP method. In case of analyzing a pore distribution in accordance with the MP method, the adsorption isotherm is at first obtained by adsorbing nitrogen on the porous carbon material. Then, this adsorption isotherm is converted into the pore volume with respect to the thickness 't' of the adsorption layer (conducting 't' plot). Then, the curve of a pore distribution can be obtained based on a curvature (an amount of change with respect to an amount of change of the thickness 't' of the adsorption layer) of this plot (refer to page 72 to page 73 and page 82 of the manual of analysis software of BELSORP-mini and BELSORP available from Bell Japan Inc.).

The porous carbon material precursor is treated with acid or alkali. Specific examples of the treatment method may include immersing the porous carbon material precursor in an acidic or alkaline aqueous solution, and causing a reaction between the porous carbon material precursor and acid or alkali in the gas phase. More specifically, when the treatment is performed with acid, examples of the acid may include fluorine compounds indicating acidity, such as hydrogen fluoride, hydrofluoric acid, ammonium fluoride, calcium fluoride and sodium fluoride. When fluorine compounds are used, the amount of fluorine element may be four times the amount of silicon element in silicon components contained in the porous carbon material precursor, and the concentration of an aqueous solution of fluorine compounds is preferably 10% by mass or more. When removing silicon components (for example, silicon dioxide) contained in the porous carbon material precursor with hydrofluoric acid, silicon dioxide reacts with hydrofluoric acid as indicated by Chemical Formula (A) or Chemical Formula (B), to be removed as hexafluorosilicic acid ($H_2SiF_6$) or silicon tetrafluoride ($SiF_4$). Thus, a porous carbon material intermediate can be obtained. Thereafter, washing and drying may be performed.

$SiO_2 + 6HF \rightarrow H_2SiF_6 + 2H_2O$      (A)

$SiO_2 + 4HF \rightarrow SiF_4 + 2H_2O$      (B)

Also, when the treatment is performed with alkali (a base), an example of the alkali may include sodium hydroxide. When an alkaline aqueous solution is used, the pH of the aqueous solution may be 11 or more. When removing silicon components (for example, silicon dioxide) contained in the porous carbon material precursor with sodium hydroxide, an aqueous solution of sodium hydroxide is heated so that silicon dioxide reacts as indicated by Chemical Formula (C) to be removed as sodium silicate ($Na_2SiO_3$). Thus, a porous carbon material intermediate can be obtained. Also, when sodium hydroxide is brought into a reaction in the gas phase for treatment, a solid body of sodium hydroxide is heated so as to react as indicated by Chemical Formula (C) to be removed as sodium silicate ($Na_2SiO_3$). Thus, a porous carbon material intermediate can be obtained. Thereafter, washing and drying may be performed.

$SiO_2 + 2NaOH \rightarrow Na_2SiO_3 + H_2O$      (C)

The average particle size of the porous carbon material can be measured in the following method. That is, 0.6 g of a sample is added in 400 g of a 30% by mass aqueous solution of sodium peroxodisulfate, and the mixture is sufficiently stirred at 24° C. Thereafter, the obtained product is applied with ultrasonic waves for 3 hours in a state where 40° C. is maintained. Then, the operation of performing centrifugation, removing the liquid phase and adding water for ultrasonic cleaning is performed twice. Subsequently, the obtained solid phase is dispersed in water to measure the particle size using a zeta-potential and particle size measuring system ELSZ-2 available from Otsuka Electronics Co., Ltd. Specifically, the particle size is measured based on the dynamic light scattering method in which particles dispersed in the solution is irradiated with a laser beam to observe its scattered light using a photon detector. It is noted that when the concentration is high, appropriate dilution is performed for measurement.

Also, the average particle size of the porous carbon material constituting an electrode, that is, the porous carbon material being in a state of an electrode, can be obtained through observation using a scanning electron microscope. Alternatively, the porous carbon material is peeled off from an electrode, and the obtained sample can be used for measurement in the following method. That is, the sample is placed in N-methyl-2-pyrrolidone (NMP), and is stirred at 200° C. for 3 hours. Thereafter, the sample is dried under a nitrogen atmosphere at 300° C. for 48 hours. Next, 0.6 g of the sample is added in 400 g of a 30% by mass aqueous solution of sodium peroxodisulfate, and the mixture is sufficiently stirred at 24° C. Subsequently, the obtained product is applied with ultrasonic waves for 3 hours in a state where 40° C. is maintained. It is noted that the above-described operation is performed multiple times as necessary. Then, the operation of performing centrifugation, removing the liquid phase and adding water for ultrasonic cleaning is performed twice. Thereafter, the obtained solid phase is dispersed in water to measure the particle size using ELSZ-2 available from Otsuka Electronics Co., Ltd.

An example of the pulverization method may include, other than the pulverization method using a bead mill, the method using a ball mill or a jet mill Example 1

Example 1 relates to an electrode material for secondary batteries and a manufacturing method thereof, and a secondary battery, according to the present disclosure.

The electrode material according to Example 1 is derived from a plant, and includes a porous carbon material having an average particle size of less than 4 μm, and preferably not more than 0.5 μm. Also, the secondary battery according to Example 1 is provided with an electrode including a porous carbon material that is derived from a plant and that has an average particle size of less than 4 lam, and preferably not more than 0.5 μm. Here, in the secondary battery according to Example 1, a positive electrode is constituted by an electrode. Also, the secondary battery according to Example 1 includes a lithium-sulfur secondary battery, and the electrode carries sulfur or a sulfur compound. In the manufacturing method of the electrode material for secondary batteries according to Example 1, a plant-derived material is carbonized at 400° C. to 1400° C., treated with acid or alkali, and then pulverized, to obtain an electrode material for secondary batteries including a porous carbon material having a particle size of less than 4 lam, and preferably not more than 0.5 μm.

Specifically, in Example 1, chaff that is a plant-derived material having a silicon (Si) content rate of 5% by mass or more was used as a raw material, and was carbonized (calcined) at 800° C. under a nitrogen atmosphere, to obtain a porous carbon material precursor. Next, the obtained porous carbon material precursor was immersed in a 48% by volume aqueous solution of hydrofluoric acid overnight for acid treatment to remove silicon components in the carbonized plant-derived material. Thereafter, water and ethyl alcohol was used for washing until pH became 7, and drying was performed. Thus, a porous carbon material intermediate was obtained.

Thereafter, the porous carbon material intermediate was heated up to 900° C. under a nitrogen atmosphere, and subjected to activation treatment with water vapor (used amount: 5 L/min) for 3 hours. Subsequently, the intermediate was mixed with ethyl alcohol, and pulverized by using a bead mill. Thus, an electrode material of Example 1A was obtained. Furthermore, the electrode material of Example 1A was subjected to heat treatment at a temperature exceeding the temperature during carbonization (specifically, 800° C.). Specifically, for performing heat treatment, the temperature was raised to 1400° C. at 5° C./min, and thereafter maintained at 1400° C. for one hour, under a nitrogen atmosphere. Thus, an electrode material of Example 1B was obtained.

On the other hand, materials of Example 1C and Comparative Example 1 were manufactured based on the following method. That is, a porous carbon material precursor was obtained using the same plant-derived material as Example 1 based on a similar method to Example 1. Next, the obtained porous carbon material precursor was immersed in a 20% by mass aqueous solution of sodium hydroxide at 80° C. overnight for alkali treatment, to remove silicon components in the carbonized plant-derived material. Thereafter, water and ethyl alcohol was used for washing until pH became 7, and drying was performed. Thus, a porous carbon material intermediate was obtained. Next, the temperature was raised to 900° C. under a nitrogen atmosphere, to perform activation treatment with water vapor. Then, the material obtained as described above was pulverized into 4 μm using a jet mill. Thus, a material of Comparative Example 1 was obtained. Also, the material of Comparative Example 1 was pulverized to 0.2 μm using a bead mill to obtain Example 1C.

Figure 2:
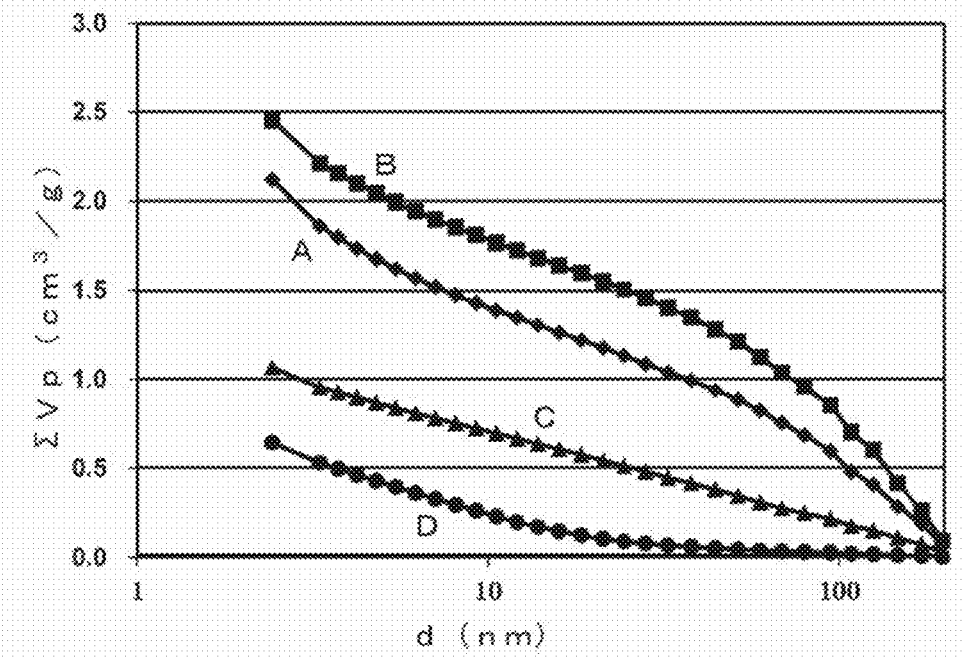
FIG. 2 is a graph illustrating cumulative volumes of mesopores and macropores in electrode materials (porous carbon materials) according to Example 1A, Example 1B, Example 1C and Comparative Example 1.
Figure 3:
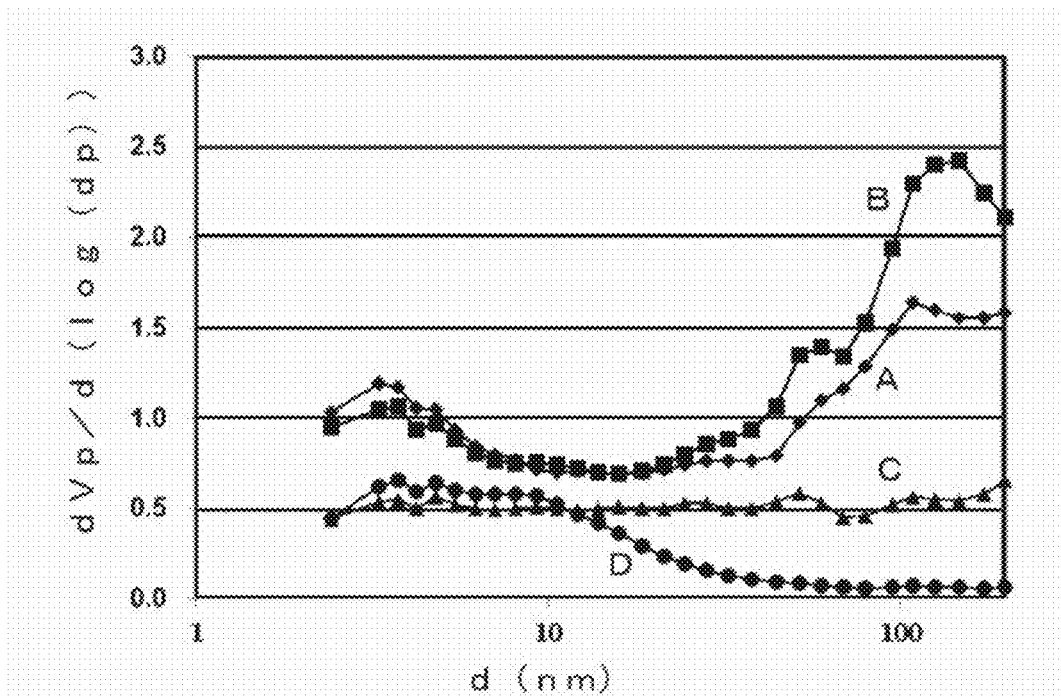
FIG. 3 is a graph illustrating pore distributions of mesopores and macropores in electrode materials (porous carbon materials) according to Example 1A, Example 1B, Example 1C and Comparative Example 1.
Figure 4:
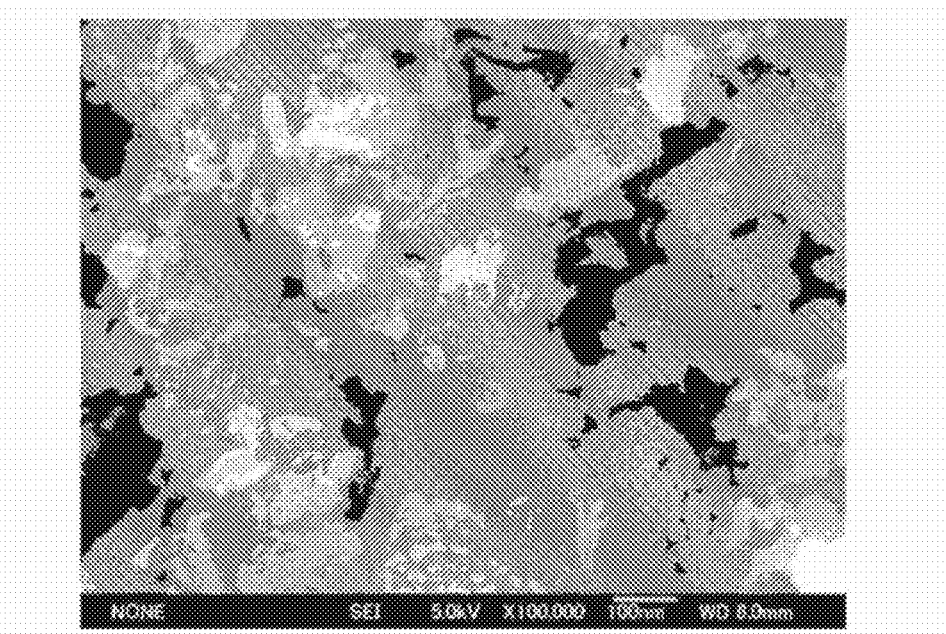
FIG. 4A and FIG. 4B are scanning electron micrographs of an electrode material (porous carbon material) according to Example 1A at a magnification of 100,000 times and 30,000 times respectively.
Figure 4:
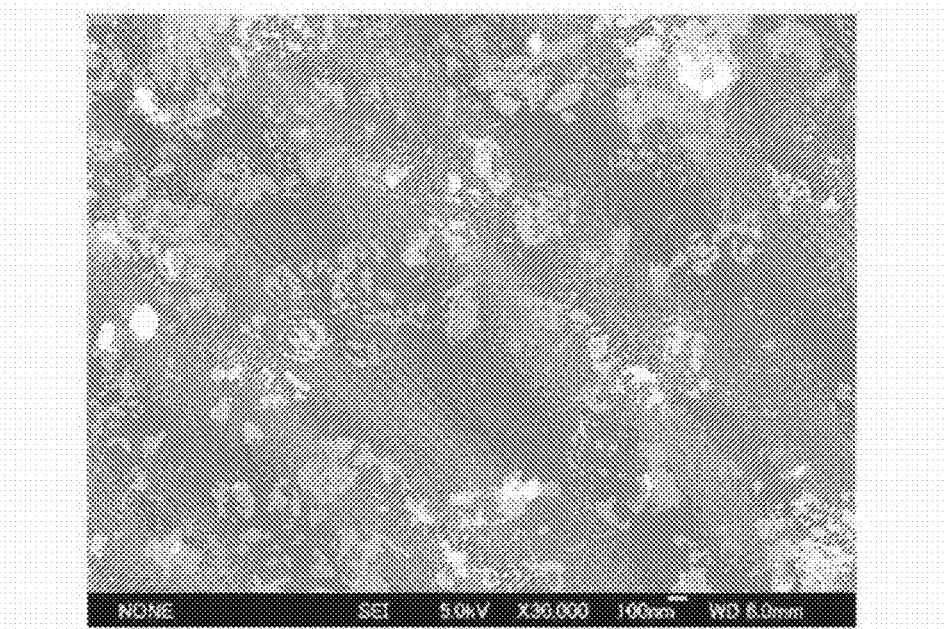
Figure 5:
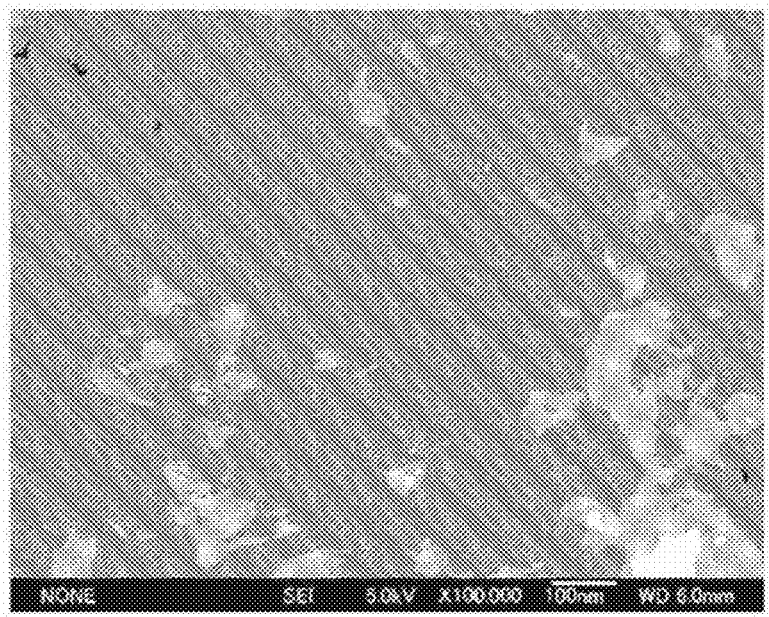
FIG. 5A and FIG. 5B are scanning electron micrographs of an electrode material (porous carbon material) according to Example 1B at a magnification of 100,000 times and 30,000 times respectively.
Figure 5:
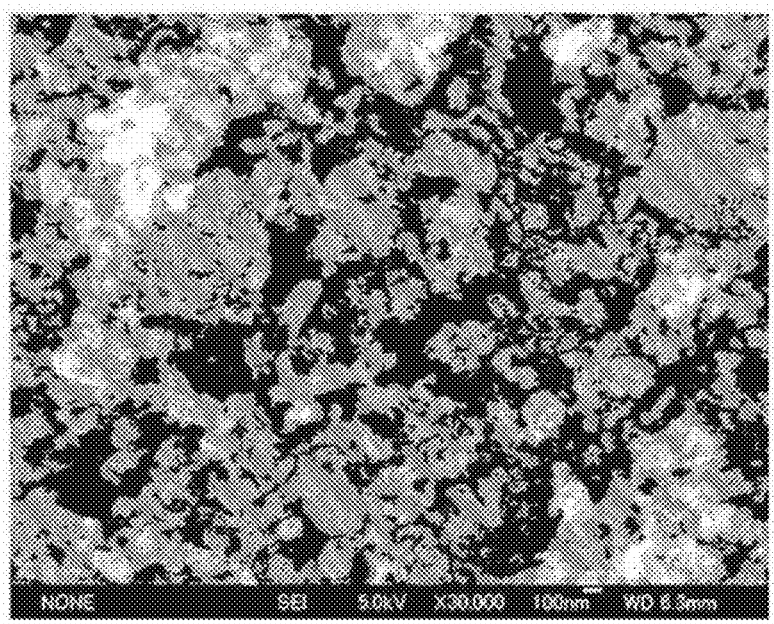
Figure 6:
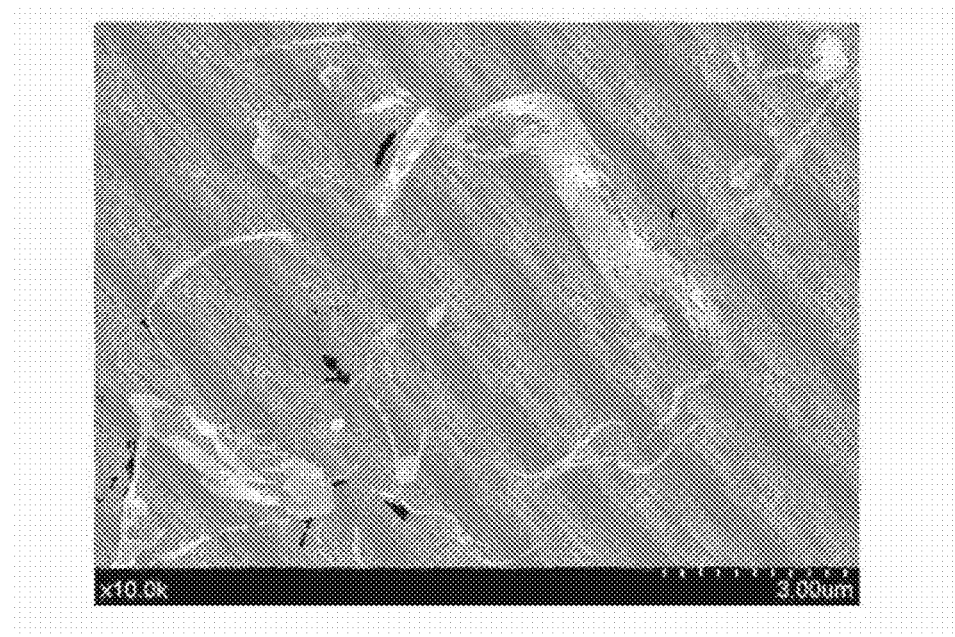
FIG. 6 is a scanning electron micrograph of a material according to Comparative Example 1.

The analysis results of the electrode materials (porous carbon materials) of Example 1A and Example 1B and the material of Comparative Example 1 are shown in Table 1 and Table 2 below. It is noted that in Table 1, "Nitrogen BET method" and "MP method" refer to the value (unit: $m^2/g$) of the specific surface area using the nitrogen BET method and the value (unit: $cm^3/g$) of the volume of pores using the MP method respectively. Also, the unit of the volume of all pores is "$cm^3/g$". In Table 2, "BJH method", "BJH method (<=50 nm)", "BJH method (>50 nm)" refer to the value (unit: $cm^3/g$) of the volume of pores having any pore size using the BJH method, the value (unit: $cm^3/g$) of the volume of pores having a pore size of 50 nm or less using the BJH method, and the value (unit: $cm^3/g$) of the volume of pores having a pore size of more than 50 nm and not more than 200 nm using the BJH method respectively. It is noted that the silicon (Si) content rate of the electrode material (porous carbon material) of Example 1A was 1.0% by mass. Also, a graph of cumulative volumes of micropores in the electrode materials (porous carbon materials) of Example 1A, Example 1B, Example 1C and Comparative Example 1 is illustrated in FIG. 1; a graph of cumulative volumes of mesopores and macropores is illustrated in FIG. 2; and a pore distribution graph of mesopores and macropores in the electrode materials (porous carbon materials) of Example 1A, Example 1B, Example 1C and Comparative Example 1 is illustrated in FIG. 3. It is noted that in FIG. 1, FIG. 2 and FIG. 3, "A" indicates data of Example 1A; "B" indicates data of Example 1B; "C" indicates data of Example 1C; and "D" indicates data of Comparative Example 1. Furthermore, scanning electron micrographs for the electrode material (porous carbon material) of Example 1A are shown in FIG. 4A (100,000 times) and FIG. 4B (30,000 times); scanning electron micrographs for the electrode material (porous carbon material) of Example 1B are shown in FIG. 5A (magnification: 100,000 times) and FIG. 5B (magnification: 30,000 times); and a scanning electron micrograph (magnification: 10,000 times) for the material of Comparative Example 1 is shown in FIG. 6.

TABLE 1

|  | Particle size | N BET method | Vol. of all pores | MP method |
|---|---|---|---|---|
| Example 1A | 0.18 μm | 1890 | 2.62 | 0.70 |
| Example 1B | 0.18 μm | 1774 | 2.89 | 0.60 |
| Example 1C | 0.20 μm | 1062 | 1.43 | 0.30 |
| Comp. Example 1 | 4.0 μm | 1180 | 0.99 | 0.45 |

TABLE 2

|  | BJH method | BJH method (<=50 nm) | BJH method (>50 nm) |
|---|---|---|---|
| Example 1A | 2.12 | 0.88 | 1.24 |
| Example 1B | 2.45 | 1.21 | 1.23 |
| Example 1C | 1.06 | 0.72 | 0.34 |
| Comp. Example 1 | 0.64 | 0.60 | 0.04 |

As obvious from Table 1 and Table 2, when the average particle size of the porous carbon material is less than 4 μm, and preferably not more than 0.5 μm, all of the value of the specific surface area using the nitrogen BET method, the volume of all pores, the value of the volume of pores using the MP method, and the value of the volume of pores using the BJH method was larger than those for Comparative Example 1. Especially, the value of the volume of pores using the BJH method was remarkably larger than that for Comparative Example 1.

An electrode was prepared based on the porous carbon material and the like. Furthermore, a lithium-sulfur secondary battery was prototyped. Here, a positive electrode is constituted by an electrode, and the electrode carries sulfur. That is, using $S_8$ sulfur, the porous carbon materials of Example 1A and Example 1B, and the like, positive electrodes for lithium-sulfur secondary batteries were prototyped. Specifically, a slurry according to the formulation indicated in Table 3 below was prepared. It is noted that "KB6" is a carbon material available from Lion Corporation, and is added for the purpose of improving conductivity; and "PVA" is an abbreviation of polyvinyl alcohol, and functions as a binding agent.

TABLE 3

|  | % by mass |
| --- | --- |
| $S_8$ sulfur | 60 |
| Porous carbon material (or material of Comp. Example 1) | 27 |
| KB6 | 3 |
| PVA | 10 |

More specifically, the above-described formulated product (positive electrode material) was kneaded in a mortar together with N-methyl-2-pyrrolidone (NMP) which was added as a solvent, so as to become slurry-like. Then, the kneaded product was applied on an aluminum foil, and dried with hot air at 120° C. for 3 hours. Next, a hot press apparatus was used for hot pressing under the condition of a temperature of 80° C. and a pressure of 580 kgf/cm², in order to increase the density of the positive electrode material, so that the occurrence of damage caused by contact with an electrolytic solution is inhibited, and the resistance value decreases. Thereafter, punching was performed such that the diameter became 15 mm, and vacuum drying was performed at 60° C. for 3 hours to remove water and the solvent. The positive electrode portion (positive electrode material layer), excluding the aluminum foil, obtained as described above had a thickness of 80 μm to 100 μm, a mass of 8 mg to 12 mg, and a density of approximately 0.6 g/cm³. Next, using the positive electrode obtained as described above, a lithium-sulfur secondary battery including a 2016-type coin battery was assembled. Specifically, the positive electrode including the aluminum foil and the positive electrode material layer, an electrolytic solution, a lithium foil having a thickness of 0.8 mm, and a nickel mesh were laminated to assemble a lithium-sulfur secondary battery including a 2016-type coin battery. It is noted that a solution of 0.5 mol of LiTFSI and 0.4 mol of $LiNO_3$ dissolved in a mixed solvent of dimethyl ether and 1,3 deoxy acid (volume ratio: 1/1) was used as an electrolytic solution.

The condition for the charge and discharge test of the lithium-sulfur secondary battery was as indicated in Table 4 below. It is noted that the discharge condition was 0.05 C. The test results are shown in Table 5 below. It is apparent that the charge and discharge capacities of the secondary batteries of the examples in which positive electrodes were constituted from the porous carbon materials of Example 1A and Example 1B were larger by approximately twice than that of the secondary battery of the comparative example in which the positive electrode was constituted from the material of Comparative Example 1.

TABLE 4

| Current: | 0.05 C |
| --- | --- |
| Cutoff: | 1.5 V at discharging (constant current discharging) |
|  | 3.3 V at charging (constant current/constant voltage charging) |

TABLE 5

Charge and discharge capacity (mAh/sulfur 1 g)

|  | Example 1A | Example 1B | Example 1C | Comp. Example 1 |
| --- | --- | --- | --- | --- |
| 1st discharge | 1221 | 1009 | 705 | 542 |
| 2nd charge | 1315 | 1182 | 850 | 582 |
| 2nd discharge | 1199 | 1107 | 796 | 513 |
| 3rd charge | 1203 | 1115 | 804 | 500 |
| 3rd discharge | 1158 | 1052 | 757 | 463 |

Although the present disclosure has been described based on the preferred examples, the present disclosure is not restricted to these examples, and various modifications are possible. Although it has been described in the examples that chaff is used as a raw material of the porous carbon material, other plants may be used as a raw material. Here, examples of other plants may include straw, reed or "kuki wakame" (sliced seaweed stem), a vascular bundle plant which is vegetative on land, a pteridophyte, a bryophyte, algae and seagrass. These may be used alone or may be used as a combination of two or more. Specifically, for example, straw of rice plant (for example, Isehikari grown in Kagoshima Prefecture) may be used as a plant-derived material that is a raw material of a porous carbon material, and the straw as a raw material of the porous carbon material may be carbonized to be converted into a carbonaceous substance (porous carbon material precursor), and subjected to acid treatment to obtain a porous carbon material intermediate. Alternatively, reed of Poaceae may be used as a plant-derived material that is a raw material of a porous carbon material, and the reed of Poaceae as a raw material may be carbonized to be converted into a carbonaceous substance (porous carbon material precursor), and subjected to acid treatment to obtain a porous carbon material intermediate. Also, a porous carbon material obtained by treatment with alkali (a base) such as an aqueous solution of sodium hydroxide, instead of an aqueous solution of hydrofluoric acid, showed similar results. It is noted that the manufacturing method of the porous carbon material can be similar to that of Example 1.

Alternatively, "kuki wakame" (sliced seaweed stem) (grown at Sanriku in Iwate Prefecture) may be used as a plant-derived material that is a raw material of a porous carbon material, and the kuki wakame as a raw material can be converted into a carbonaceous substance (porous carbon material precursor) and then subjected to acid treatment to obtain a porous carbon material intermediate. Specifically, first, for example, kuki wakame is heated at a temperature of approximately 500° C., to be subjected to preliminary carbonization treatment in which carbonization is performed. It is noted that before heating, for example, kuki wakame which becomes a raw material may be treated with alcohol. A specific treatment method may include a method of immersion in ethyl alcohol or the like. Accordingly, moisture contained in the raw material can be reduced, and elements other than carbon contained in a finally obtained porous carbon material, and mineral components can be solubilized. Also, this treatment with alcohol enables inhibition of gas generation during carbonization. More specifically, kuki wakame is immersed in ethyl alcohol for 48 hours. It is noted that ultrasonic treatment is preferably performed in ethyl alcohol. Next, this kuki wakame is heated in a nitrogen gas stream at 500° C. for 5 hours for carbonization to obtain a carbide. It is noted that when such preliminary carbonization treatment is performed, tar components to be generated during next carbonization can be reduced or removed. Thereafter, 10 g of this carbide is placed in an alumina crucible, and heated to 1000° C. at a temperature increasing rate of 5° C./min in a nitrogen gas stream (10 L/min). Then, carbonization is performed at 1000° C. for 5 hours, for conversion into a carbonaceous substance (porous carbon material precursor), and thereafter the temperature is cooled to room temperature. It is noted that nitrogen gas is flown all the time during carbonization and cooling. Next, this porous carbon material precursor is immersed in a 46% by volume aqueous solution of hydrofluoric acid overnight for acid treatment. Thereafter, water and ethyl alcohol are used for washing until pH becomes 7, and drying is performed. Thus, a porous carbon material intermediate can be obtained.

Additionally, the present technology may also be configured as below.

[1]<<Electrode material for secondary batteries>>

An electrode material for secondary batteries, including: a porous carbon material being derived from a plant and having an average particle size of less than 4 μm, preferably 0.5 μm or less.

[2] The electrode material for secondary batteries according to [1], wherein the porous carbon material has a value of a specific surface area using a nitrogen BET method of 10 $m^2/g$ or more, and a volume of pores using a BJH method of 0.7 $cm^3/g$ or more.

[3] The electrode material for secondary batteries according to [1] or [2],
wherein the porous carbon material includes, as a raw material, a plant-derived material having a silicon content rate of 5% by mass or more.

[4]<<Secondary battery including electrode>>

A secondary battery including:
an electrode including a porous carbon material being derived from a plant and having an average particle size of less than 4 μm, preferably 0.5 μm or less.

[5] The secondary battery according to [4], wherein a positive electrode is constituted by the electrode.

[6] The secondary battery according to [4] or [5],
wherein the secondary battery is a lithium-sulfur secondary battery, and
wherein the electrode carries sulfur or a sulfur compound.

[7] The secondary battery according to any one of [4] to [6],
wherein the porous carbon material has a value of a specific surface area using a nitrogen BET method of 10 $m^2/g$ or more, and a volume of pores using a BJH method of 0.7 $cm^3/g$ or more.

[8] The secondary battery according to any one of [4] to [7],
wherein the porous carbon material includes, as a raw material, a plant-derived material having a silicon content rate of 5% by mass or more.

[9]<<Manufacturing method of electrode material for secondary batteries>>

A manufacturing method of an electrode material for secondary batteries, the method including:
after carbonizing a plant-derived material at 400° C. to 1400° C., performing treatment with acid or alkali on the carbonized material, and then pulverizing the treated material, to obtain the electrode material for secondary batteries including a porous carbon material having an average particle size of less than 4 μm, preferably 0.5 μm or less.

[10] The manufacturing method of an electrode material for secondary batteries according to [9], further including:
performing, after the pulverizing, heat treatment at a temperature exceeding a temperature during the carbonizing.

[11] The manufacturing method of an electrode material for secondary batteries according to [9] or [10], wherein the treatment with acid or alkali causes silicon components in the carbonized plant-derived material to be removed.

[12] The manufacturing method of an electrode material for secondary batteries according to any one of [9] to [11], wherein the porous carbon material includes, as a raw material, a plant-derived material having a silicon content rate of 5% by mass or more.

[13] The manufacturing method of an electrode material for secondary batteries according to any one of [9] to [12], wherein a positive electrode is constituted by the electrode.

[14] The manufacturing method of an electrode material for secondary batteries according to any one of [9] to [13],
wherein the secondary battery is a lithium-sulfur secondary battery, and
wherein the electrode carries sulfur or a sulfur compound.

[15] The manufacturing method of an electrode material for secondary batteries according to any one of [9] to [14],
wherein the porous carbon material has a value of a specific surface area using a nitrogen BET method of 10 $m^2/g$ or more, and a volume of pores using a BJH method of 0.7 $cm^3/g$ or more.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrode material for secondary batteries, the electrode material comprising: a porous carbon material being derived from a plant and having an average particle size of less than 4 μm, wherein the porous carbon material comprises first pores having a first pore size of 50 nm or less and a first cumulative pore volume of 0.7 $cm^3/g$ and second pores having a second pore size of 50 nm to 200 nm and a second cumulative pore volume of more than 0.1 $cm^3/g$, and the porous carbon material comprises micropores having a pore size of 0.8 nm to 1 nm.

2. The electrode material according to claim 1, wherein the porous carbon material has a value of a specific surface area using a nitrogen BET method of 10 $m^2/g$ or more, and a volume of pores using a BJH method of 0.7 $cm^3/g$ or more.

3. The electrode material according to claim 1, wherein the porous carbon material is obtained from a plant-derived material having a silicon content of 5% by mass or more by carbonizing, treating with acid or alkali, and pulverizing the plant-derived material.

4. The electrode material according to claim 1, wherein the porous carbon material comprises a silicon content of not more than 1% by mass.

5. The electrode material of claim 1, wherein a specific surface area of the porous carbon material is 400 $m^2/g$ or more.

6. The electrode material of claim 1, wherein a volume of pores of the porous carbon material is more than 1 $cm^3/g$.

7. A secondary battery comprising: an electrode including a porous carbon material being derived from a plant and having an average particle size of less than 4 μm, wherein the porous carbon material comprises first pores having a first pore size of 50 nm or less and a first cumulative pore volume of 0.7 $cm^3/g$ and second pores having a second pore size of 50 nm to 200 nm and a second cumulative pore volume of more than 0.1 cm$^3$/g, and the porous carbon material comprises micropores having a pore size of 0.8 nm to 1 nm.

8. The secondary battery according to claim 7, wherein a positive electrode is constituted by the electrode.

9. The secondary battery according to claim 7, wherein the secondary battery is a lithium-sulfur secondary battery, and wherein the electrode carries sulfur or a sulfur compound.

10. A manufacturing method of an electrode material for secondary batteries, the method comprising: after carbonizing a plant-derived material at 400° C. to 1400° C., performing treatment with acid or alkali on the carbonized material, and then pulverizing the treated material, to obtain the electrode material for secondary batteries including a porous carbon material having an average particle size of less than 4 μm, wherein the porous carbon material comprises first pores having a first pore size of 50 nm or less and a first cumulative pore volume of 0.7 cm$^3$/g and second pores having a second pore size of 50 nm to 200 nm and a second cumulative pore volume of more than 0.1 cm$^3$/g, and the porous carbon material comprises micropores having a pore size of 0.8 nm to 1 nm.

11. The manufacturing method of an electrode material for secondary batteries according to claim 10, further comprising: performing, after the pulverizing, heat treatment at a temperature exceeding a temperature during the carbonizing.

12. The manufacturing method of an electrode material for secondary batteries according to claim 10, wherein the treatment with acid or alkali causes silicon components in the carbonized plant-derived material to be removed.

13. The manufacturing method of an electrode material for secondary batteries according to claim 10, wherein the plant-derived material has a silicon content of 5% by mass or more.

* * * * *